No. 853,543. PATENTED MAY 14, 1907.
D. E. FELT & C. P. WETMORE.
TABULATING MACHINE.
APPLICATION FILED DEC. 27, 1904.

Witnesses:
Wm. Geiger
H. W. Munday

Inventors:
Charles P. Wetmore
Dorr E. Felt
By Munday, Evarts & Adcock,
Attorneys No. 853,543. PATENTED MAY 14, 1907.
D. E. FELT & C. P. WETMORE.
TABULATING MACHINE.
APPLICATION FILED DEC. 27, 1904.
10 SHEETS—SHEET 2.

Fig. 2

Witnesses:
Wm. Geiger
A. W. Munday

Inventors:
Charles P. Wetmore
Dorr E. Felt
By Munday, Evarts, Adcock
Attorneys No. 853,543. PATENTED MAY 14, 1907.
D. E. FELT & C. P. WETMORE.
TABULATING MACHINE.
APPLICATION FILED DEC. 27, 1904.

No. 853,543. PATENTED MAY 14, 1907.
D. E. FELT & C. P. WETMORE.
TABULATING MACHINE.
APPLICATION FILED DEC. 27, 1904.
10 SHEETS—SHEET 8.

Witnesses:
Wm. Geiger

Inventors:
Charles P Wetmore
Dorr E Felt
By Munday, Evarts & Adcock,
Attorneys No. 853,543. PATENTED MAY 14, 1907.
D. E. FELT & C. P. WETMORE.
TABULATING MACHINE.
APPLICATION FILED DEC. 27, 1904.

Witnesses:
Wm. Geiger

Inventors:
Charles P. Wetmore
Dorr E. Felt
By Munday, Evarts & Adcock,
Attorneys

UNITED STATES PATENT OFFICE.

DORR E. FELT AND CHARLES P. WETMORE, OF CHICAGO, ILLINOIS, ASSIGNORS TO COMPTOGRAPH COMPANY, OF CHICAGO, ILLINOIS, A CORPORATION OF ILLINOIS.

TABULATING-MACHINE.

No. 853,543.　　　Specification of Letters Patent.　　　Patented May 14, 1907.

Application filed December 27, 1904. Serial No. 238,316.

*To all whom it may concern:*

Be it known that we, DORR E. FELT and CHARLES P. WETMORE, citizens of the United States, residing in Chicago, in the county of Cook and State of Illinois, have invented a new and useful Improvement in Tabulating-Machines, of which the following is a specification.

This invention is a modification of and in some respects an improvement upon the construction of listing machines shown in Patent No. 749,177, dated January 12, 1904 to D. E. Felt.

It embodies an improved construction of spring cushioning mechanisms for avoiding shocks and jars to the mechanism from the power lever; an improved construction of governor for regulating the speed of the mechanism; an improved construction of canceling mechanism, adapted to operate automatically on the printing of the total; means for preventing the cancellation whenever desired; means for preventing changes in the lever whereby the total printing is caused pending full strokes of the power device; means for preventing double printing by the printing hammers, and other features of invention, all of which are fully set forth below.

In the accompanying drawing forming a part of this specification, and in which similar reference characters indicate similar parts, Fig. 11 is a partial longitudinal section showing one of the numeral wheels and its controlling devices. Figs. 12 and 13 are sections upon the lines 12—12 and 13—13 respectively of Fig. 11. Figs. 14 and 15 are side and sectional views respectively of one of the numeral wheels. Fig. 15ª is a section on the line 15ª—15ª of Fig. 14. Figs. 16 and 17 are respectively a side elevation and a section of one of the numeral wheel driving disks. Fig. 18 is a side elevation of the unit numeral wheel and Fig. 19 a similar view of the numeral wheels employed for all denominations above the units, these two figures showing the relative positions of the wheels preparatory to the final operation in canceling. Fig. 20 shows the cam for operating the answer ring bar.

Our machine embodies any desired number of denominations, and in each denomination are nine digital keys shown at 20, arranged in rows extending backward from the front of the machine. The stems of these keys extend downward between pairs of guide plates 21 and 22 and are provided with lifting springs 24 on the plates 22. The plates 21 and 22 of each section are preferably united at their ends and by posts 27 through which cross bars 23 may extend.

Below each denominational series of keys is a key locking plate 28 shown in Figs. 3 and 4 and hinged at its ends in the ends 26 of the key frames as seen at 29 in the same figures, so that the plate may be swung laterally by the keys when the latter are depressed, each plate being provided with springs pressing it toward the keys, so that when deflected by the descent of any key, the plate will swing back under the power of its spring and lock the key as soon as its bent end has passed below the plate. This construction is clearly illustrated in the Felt patent above referred to at Fig. 13, and need not be further described. The keys which are locked by these plates remain under their control until released by the striking of another key in the same denomination, or by the operation of the releasing lever, or in the adding operation. Directly below each denominational row of keys is also located a bar 31 having freedom to move longitudinally. It is supported upon its ends upon dolly rolls 32 and 33 and is provided with nine inclines or cams 34, one below each key embraced in the denomination, and the inclines are graduated in length according to the power of the keys under which they are located, the incline under the 9 key being long, and that under the 8 key being somewhat shorter and so on gradually diminishing in length to the incline upon the units key which is quite short. The inclines are located directly under the keys so that when the latter are struck, they come against the inclines and give longitudinal motion to the bar for a distance corresponding to the length of the incline. The variable and graduated movements of the bar received from the keys determine the action of the adding and printing mechanism, as will be understood later on. The bars are returned to their normal positions by springs 35 which are attached to legs 36 on the frame members 22 and pins 37 on the bars, but are detained in the changed positions by the keys as long as the latter remain depressed. Attached to each bar is a laterally projecting wing 38 (Figs. 3 and 4), which at each impulse given the bar by a key comes against the upper end of a movable and variably acting link 39. This link is attached to the segment lever or column actuator 40 by which the corresponding numeral wheel 41 is actuated, and by which the corresponding type segment 42 is positioned properly for printing the amount added. The attachment is preferably a pivotal one at 39ᵃ. A spring 68 acts on the link and returns it to normal position after each depression. The movement received by the link from the bar 31 positions the lower end of the link varyingly in accordance with the power of the key by which the bar is actuated, and brings the laterally projecting pin 43 on the link under or in proximity to one of the notches 44 in an arm 45 corresponding to said key. This arm which is best shown at Fig. 4 and which we call the numeral or graduated arm, is arranged in the denominational line and provided with a series of nine notches 44 corresponding to the keys of the denomination and forming a sort of rack, one notch 46 being deeper than the others and a guard 47 being placed back of notch 46. There is one such arm for each denomination, and the series of them is supported on the rock shaft 48, which we call the main actuator. The numeral arms are positioned on the main actuator by slotted cross bars 51 and 52 carried on arms 50 secured to the actuator and with the notched portion of the numeral arms 45 projecting forwardly of the main actuator, and their rear ends which are forked straddling the cross rod 49 secured in the ends of arms 50. A spring 97 extends from each numeral arm forwardly and downwardly to the cross rod 97ᵃ also inserted in the arms 50.

Figure 1:
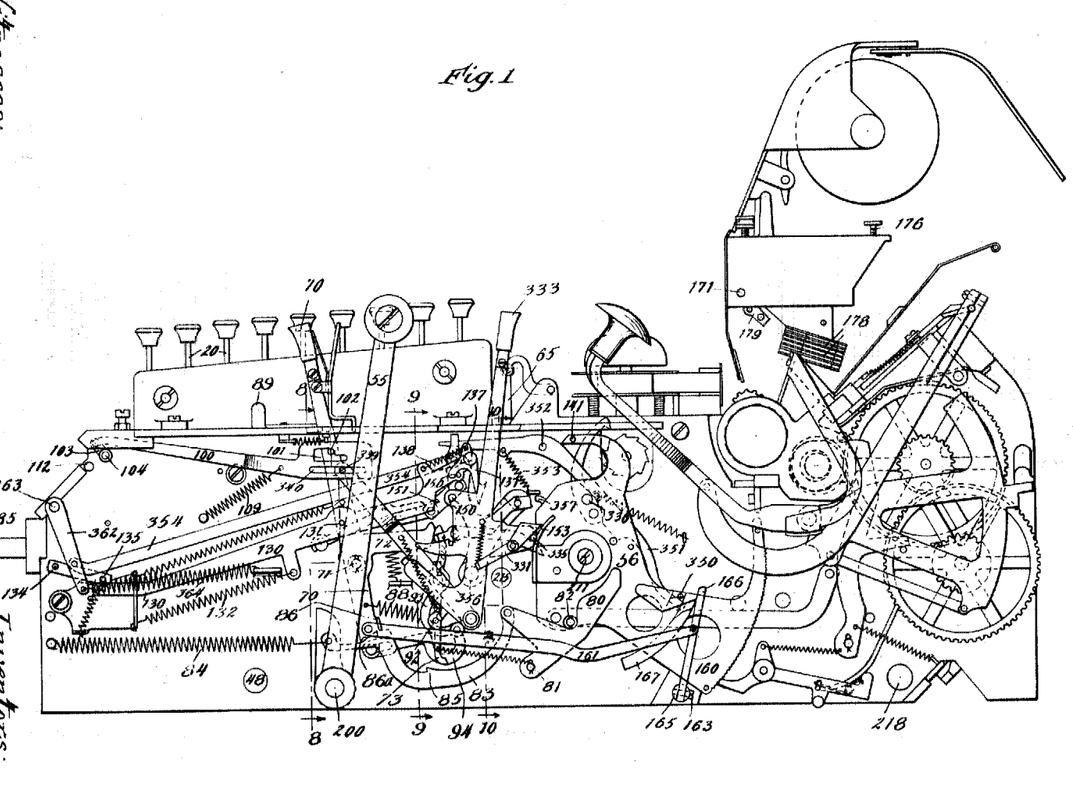
Figure 1 is a side elevation of the machine.
Figure 2:
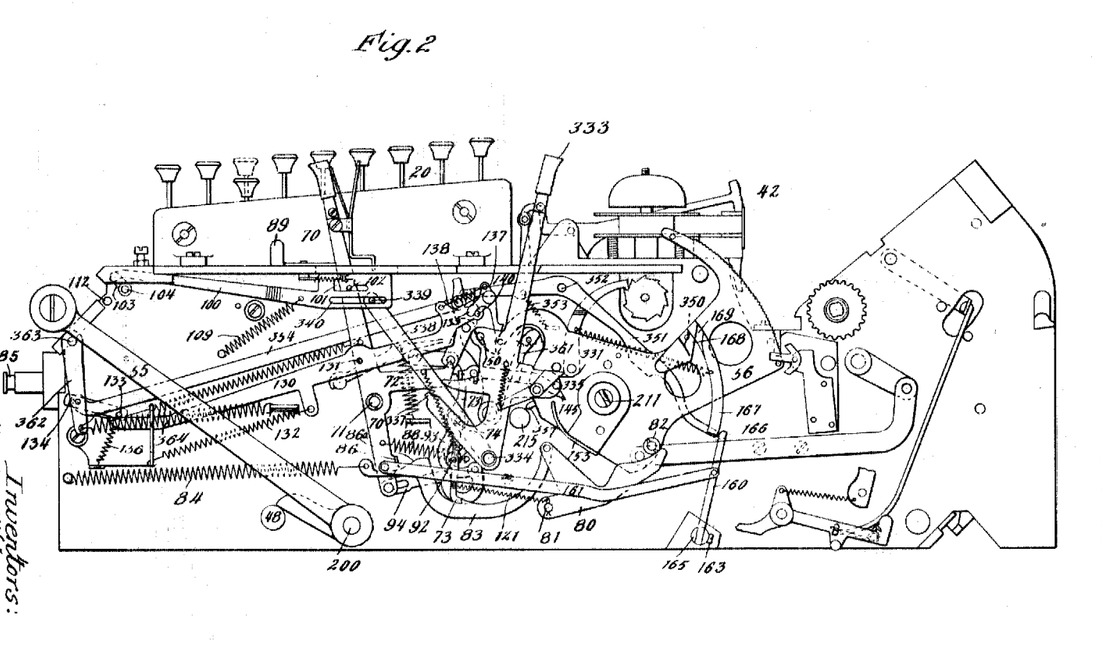
Fig. 2 is a partial side elevation showing the parts in different positions from those occupied in Fig. 1.
Figures 8, 9:
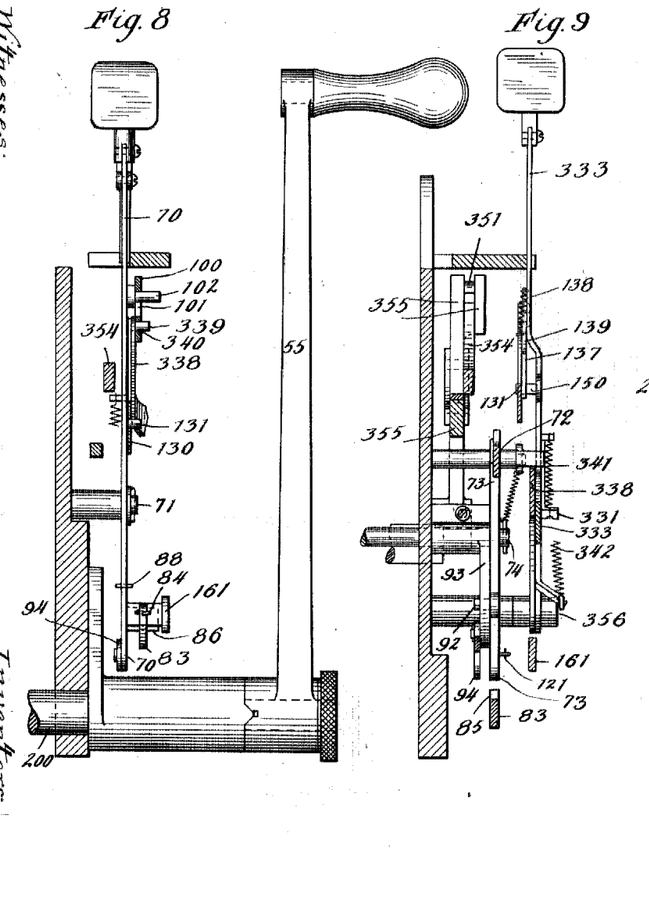
Figs. 8, 9 and 10 are sections on the lines 8—8, 9—9 and 10—10 respectively of Fig. 1.
Figure 10:
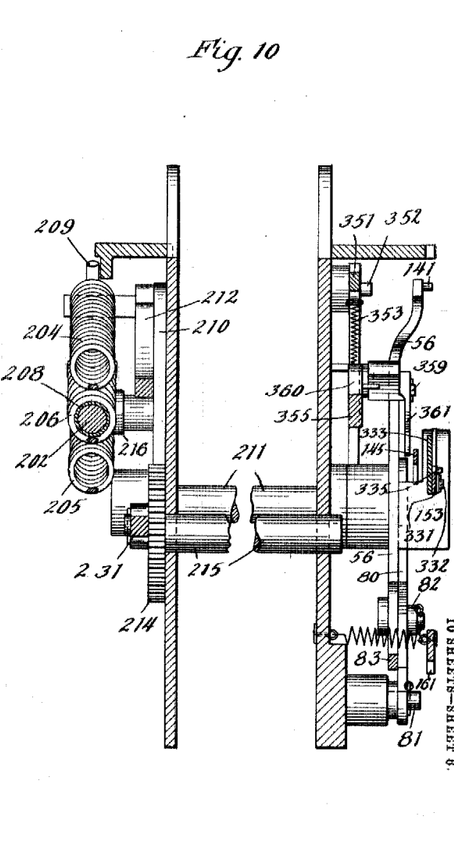

The main actuator is rocked by power from a suitable hand lever 55 shown in Figs. 1, 2 and 8 or other power device by which the machine is operated. It will be seen from the description thus far given that the rocking of the main actuator which occurs at each stroke or operation of the power device will impart a vibratory motion through an arc to the notched ends of the numeral arms, and such vibratory motions will be uniform in extent except as they may be varied by the yielding of the springs 97. In this vibratory movement, the notched or graduated portion of the numeral arms encounters the pins 43 on such of the links 39 as have been positioned by the striking of the keys, and such pins enter the notches 44, which correspond to the keys struck. With the pins centered in the notches, the main actuator completes the movement imparted to it by the power device, and in so doing, carries down the arms 45 and the latter carry with them the variable links whose pins are centered in the notches 44. The variable links give motion in turn to the column actuators, the extent of which is dependent upon the position of the notches in which the pins 43 are entered, and because of the variable movements of the links 39, the column actuators are actuated in accordance with the power of the keys and are thus adapted to add the amount represented by the depressed keys upon the register wheels, and also to position the type for printing the same amount. When the pins 43 stand under the deep notches of the arms 45, the vibration of the arms will be idle as the deep notches permit full strokes to take place without engaging the pins 43. (See Fig. 4.) The guards 47 prevent any tendency by the links to swing too far back.

Figure 3:
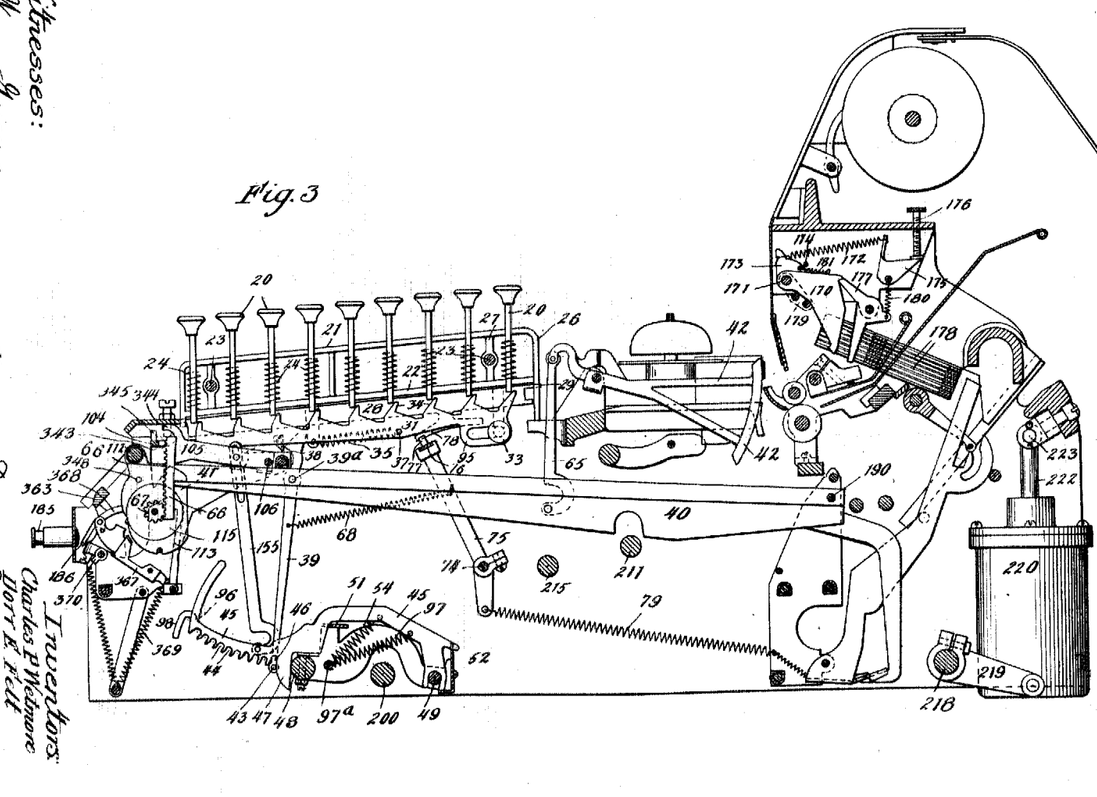
Fig. 3 is a longitudinal vertical section.
Figure 4:
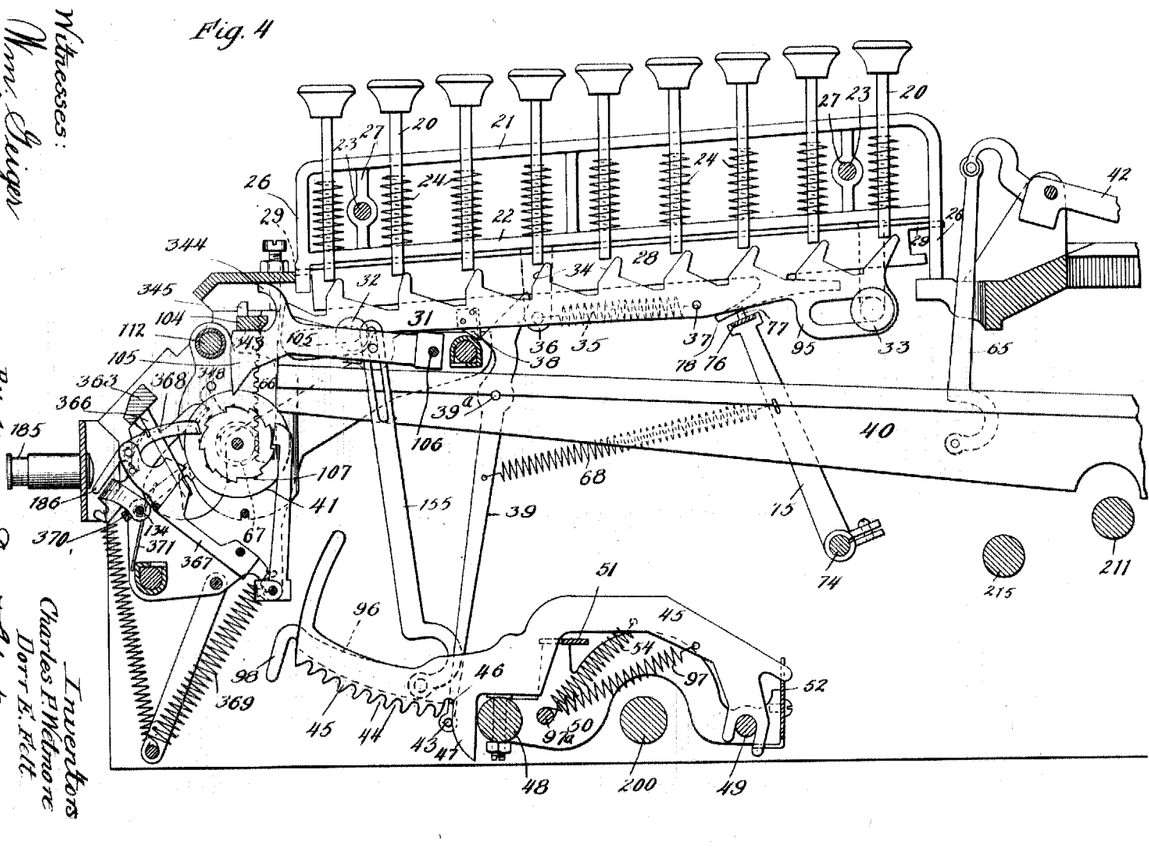
Fig. 4 is a partial longitudinal vertical section enlarged.

As shown at Fig. 3, 65 represents one of the links connecting the column actuator with the type segment and 66 is a toothed segment on the end of one of the column actuators and meshing with the pinion 67 through which the corresponding numeral wheel is turned, being connected thereto as follows: Said pinion is loose upon the numeral wheel shaft, and is attached to the side of a disk 115 upon which is a spring pressed pawl 117 adapted to engage a ratchet 118, when not prevented from so doing by the answer rings 113. The disk 115 also carries a laterally projecting pin 119 encountering a spring stop 120 on the proximate side of ratchet 118. Adjacent to the ratchet is a toothed disk 107, and next to the disk is a separating disk 107ᵃ and adjoining disk 107ᵃ is a ring carrying either the arm 346 or the arm 347. Of these, the ratchet, the toothed disk 107, the separating disk and the arm ring are mounted with the numeral wheel on a sleeve 322. All these features of the numeral wheel are more fully described below and illustrated in Figs. 11 to 17, inclusive. The column actuators are pivoted on a rod 190, so that their forward ends in the movements described travel through an arc, and they are each provided with a lifting spring, as shown at Fig. 9 of the said Felt patent.

The releasing of the depressed keys may be caused by the lever 70 which is pivoted at 71 and shown at Figs. 1, 2 and 8, and has an arm 72 bearing against the upper end of a swinging lever 73, loose on rock shaft 74, but operating said shaft in one direction by means of a laterally projecting pin 92 engaging the crank 93 fast on the shaft. The lever 73 has a retracting spring 121, and the shaft 74 extends across the machine, and is provided with a number of arms 75 on which is secured a cross bar or plate 76, having teeth 77 projecting upwardly from it.

There is one tooth 77 for each denomination, and each tooth is arranged to bear against a curved portion 78 upon a corresponding locking plate 28 in such manner that when the shaft is rocked, the tooth will be forced against the curved portion and swing the plate 28 away from its acting position, and thereby cause the release of any keys which may be locked at the time. To effect this release which is given to all the plates, the lever 70 is swung toward the rear from its intermediate position. The spring 79 attached to a depending leg on rock shaft 74 insures the immediate return of the rock shaft and parts carried by it to normal position. Portions of this same mechanism are utilized in effecting the release of the keys at the conclusion of each printing operation by the following means; pivoted at 81 is an irregular shaped plate 80 controlled by the roller 82 on cam 56, hereinafter denominated the main cam, and best shown at Figs. 1 and 2. A link 83 is attached to this plate and spring 84 draws the link toward the front of the machine. Upon the upper edge of link 83 is a shoulder 85, which, when the link is drawn rearwardly by the motion received from the cam 56, is engaged by the lower end of lever 73 when the main cam returns to normal position. When the main cam returns to normal position, it allows the link to return forwardly in obedience to spring 84 and in so doing, the link carries the lever with it for a short distance and until it slips out of engagement by reason of the depressing of link 83 by the projecting lip 86 on the lever 70, the lip being in contact with the incline 86ª. This movement of the lever 73 rocks shaft 74 Figs. 2, 3 and 9 sufficiently to release the keys through the medium of the teeth 77 and curved parts 78 already described. This same lever 70 is also employed to throw the releasing mechanism out of service when it is desired to repeat numbers, and for this purpose is swung toward the front of the machine, and in assuming this position, the arm 72 is so far withdrawn from the lever 73 as to allow the latter to rock on its pivot under the power of spring 121, and this movement carries the lower end of lever 73 so far toward the rear of the machine that engagement between it and the shoulder 85 is prevented, and consequently shaft 74 remains idle during the repeating, and none of the operations above described and usually performed by it take place. The lever is provided with a spring 88 which tends to force it into repeating position, and it is normally prevented from assuming that position by a spring catch 89. This catch is readily turned so as to release the lever when any repeating is desired. The lever 70 is also capable of being moved to a third position, and it is so moved when the answer or total is to be printed. In this position, its upper end is moved toward the rear of the machine, and the projection 72 pushes the lever 73 so far that the hook of the latter sets over the projection and locks the lever in its new position. This lock remains in force until released by the link 83 upon the conclusion of the answer printing operation. In setting the lever 70 for answer printing, the link 94 which connects the free end of crank 93 with the lower end of lever 70, imparts a greater rocking motion to shaft 74 than it receives in the ways previously described, and in this rocking movement the plate 76 engages the proximate edges of depending portions 95 of the cam bars 31 and carries all said bars toward the rear of the machine sufficiently to bring the spaces between the inclines 34 under the keys, so that if the keys are then depressed no result will be produced beyond the idle descent of the key. In this same movement of plate 76, the teeth 77 act on the locking plates 28 and swing them away from the keys, and any keys which may be down at the time will be released. The link 94 is slotted where it is joined to the lever 70 Fig. 2 so that the link need not change position when the lever is set for repeating. The increased movement given the bars 31, as just stated, also causes an increased swinging movement by the variable link 39 which carries their pins beyond the notched arms 45. As the pins project on both sides of the variable link, they are adapted, when thus positioned, to engage the spring depressed arms 96 Fig. 4 which in some respects are similar in size and shape to the arms 45 and are arranged parallel to the latter, and they are supported in the main actuator 48 and positioned by the plates 51 and 52 in much the same way as the arms 45, and each is also provided with a spring 54 attached to cross rod 97ª to hold it to the actuator. The arms 96 are provided with guards 98 at their extreme ends which act as stops to the pins 43 and prevent the links from moving too far when positioned by the cam bar. With this construction and with lever 70 set as described, we print the totals or answers by operating the main lever or power device 55, which by means of the connecting mechanism described in a later part of this specification, imparts a rocking motion to the main actuator. As already described, this rocking of the main actuator carries the arms 96 downward for variable distances, the springs 54 yielding so that the partial strokes are permitted. The length of the strokes depends on the position of the numeral wheels at the time and the column actuators are arrested when they have moved far enough to position the types corresponding to the numbers exposed on the numeral wheels in printing position.

When the lever 70 is set for printing the totals, it carries with it a bar 100 Figs. 1 and 2. This bar has a slot 101 in which is a pin 102 carried by the lever, the slot being adapted to permit changes in the position of the lever when it is shifted to secure repetitions and to cause the release of depressed keys without affecting the bar. This bar at its forward end is attached to a crank 103 on a rock shaft 104 extending across the machine and located over the series of numeral wheels. This shaft is angular so that when rocked, it is adapted to depress the series of locking stop levers 105 pivoted on a cross rod 106 and force them to engage the numeral wheels (Fig. 4.) In this manner, the numeral wheels are absolutely locked by the setting of lever 70 for answer printing and remain so until released as hereinafter stated. The stop levers engage the teeth 107 upon the numeral wheels. The shaft 104 and the bar 100 are returned to normal position by spring 109. The series of locking levers 105 is also connected to the answer arms 96 of corresponding denominations by vertical links 1 55. (See Fig. 4.) The links are slotted at their upper ends and pins on the levers 105 enter the slots. By this construction the levers 105 are forced to arrest the rotation of the numeral wheels in key printing near the end of the forward stroke of the main lever but before the printing hammers have been released.

The shaft 104 carries at its farther end a cam 111 (Fig. 24) which works in a slot formed in the sliding bar 112, extending across the series of numeral wheels and carrying a series of answer rings 113. There is one of these rings for each denomination and they are adapted to move over the disks 115 of which there is one attached to each of the pinions 67 and to hold the pawls 117 on said disks out of action while the pinions and disks are being rotated by the column actuators in positioning the type for answer printing. During this independent operation of the pinions and disks, the numeral wheels are locked by the stop levers 105, as already described. And the rotation continues until the laterally projecting pins 119 on the side of the disks encounter the spring stops 120 Figs. 14 to 15ᵃ on the proximate side of the corresponding ratchets 118. These spring stops are each provided with a pivot 320 extending laterally through the ratchet and adjacent parts as plainly seen at Fig. 15ᵃ. The acting end of the stop is controlled by a spring 321, one end of the spring being attached to the stop, and the other end after passing partially around the sleeve 322 is secured around a rivet 323 by which a clip 324 is attached to the ratchet. This spring allows the spring stop to yield to the pin 119 when the latter moves in one direction, but the pin engages said stop so as to carry the ratchet with the disk 115 when the movement is in the other direction. The clip 324 has a point 325 which normally lies over the offset portion of the pivot 320 of the stop, and serves to confine the stop with its pivot in position in the ratchet and adjacent parts. The heel of the clip 324 normally rests in an annular groove 326 formed in the disk. The rivet 323 holds the clip with sufficient firmness to prevent the heel from jumping out of the groove, but the attachment is not so rigid as to prevent the lifting of the clip from out of the groove when it is desired to insert or remove the spring stop, the lifting of the clip from the groove carrying the projection 325 away from the pivot of the stop so that the latter can be taken out by a lateral movement. The disk 115 is turned during this independent rotation in the direction in which the stop 119 engages the spring stop and as soon as the engagement takes place, the rotation of the disk 115 is arrested because the numeral wheels are already locked. This arrest takes place sooner or later, according to the position occupied by the numeral wheel at the time. Thus, if the wheel stands at 1, the arrest will take place early in the rotation of the disk. If it stands at 2, the disk will be permitted further rotation and at 3 still more and so on. And at the time of the arrest the type will have been positioned at the printing center in accordance with the numbers shown at the sight opening upon the numeral wheels so that the totals can be printed by releasing the hammers. The springs upon the answer arms accommodate any further movement of the main actuator after the column actuator and pinion have been arrested, as just described.

Ordinarily when the total is printed, it is followed by an automatic canceling operation in which the numeral wheels are all brought to zero. The mechanism for effecting this canceling is the following. Just before the main lever 55 completes its forward stroke, the pin 330 Fig. 25 on cam 56 encounters a trip 331 pivoted at 332 upon a projection from a lever 333 which we call the subtotal lever, because in addition to the function here given it, it is brought into use manually when it is desired to print the totals without canceling as described below. This lever is pivoted stationarily at 334. The trip 331 is prevented from swinging on its pivot in one direction by the pin 335 upon the subtotal lever so that when the pin 330 strikes the trip, it swings the lever 333 toward the rear of the machine. The lever 333 has a forwardly extending arm 336, the point 337 of which encounters the lever 338 rocking upon pivot 334 and carrying a pin 339 working in a slot 340 in the sliding bar 100. The swinging movement imparted to lever 338 in this manner lifts the end of the sliding bar 100 so that the pin 102 is brought into the lower part of the slot 101 and no longer holds the bar 100 in its rearward position, the lower portion of slot 101 being elongated. This leaves the spring 109 free to act and consequently, the bar is moved forwardly until pin 102 encounters the lower portion of the slot, this return movement, being, however, only a partial one and without effect on the lever 70. A spring 341 acts on the lower end of trip 331 lifting it so that it is normally in contact with the pin 335 and the spring 342 is attached to the lever 338 and to a projecting point on lever 333 at its lower end, and tends to return said lever after each operation and through said lever to also return lever 333. The positioning of lever 333 for subtotaling will be described later on.

The numeral wheel stop levers 105 are provided with flat surfaces 343 adapted to be acted upon by the shaft 104 when it is turned to force the levers into locking position, and also with overhanging horns 344 adapted to be lifted by the pins 345 which are provided upon the shaft in alinement with the stop levers, when the shaft is rotated back toward its normal position. The normal position of the shaft is illustrated at Fig. 4 and its locking position at Fig. 11. The partial stroke of bar 100 already stated, brings the shaft to a position intermediate between these extreme positions, but in so doing, while it does not shift the answer rings so as to free pawls 117, it does lift the stop levers out of engagement with the numeral wheels so that the latter are again free to turn and do turn by reason of the engagement between pin 119 and the spring stop 120. The pinion disk carrying the pin 119 is actuated by the column actuator, which is pulled down by the connection 39 receiving power from arm 98 returning to its rest on the head of screw 98ᵃ under the action of spring 97. The numeral wheel revolves until the arm 346 in the case of the unit wheel, or the arm 347 in case of the other wheels, encounters the stop 348. As soon as the wheels are released, as just described, the canceling takes place unless prevented by the positioning of the subtotal lever as stated below. In this operation, the numeral wheels are moved from the positions they occupy at the time by power exerted on the column actuators by the springs 97, which springs have been strained by the arresting of the disks 115 as described above. This rotation of the wheels carries the units wheel to the 0 position and all the others to the 9 position, the wheels being arrested in these positions by providing the units wheel with a projecting arm 346 and the other wheels with similar arms 347, all adapted to encounter pins 348 upon the answer rings Figs. 18 and 19 when the answer rings are positioned as in total printing. As will be noted from Figs. 18 and 19, the arm 346 is located differently upon the unit wheel from the location given the arms 347 upon the higher wheels. This difference in position is one which allows the unit wheel to move one space farther than the higher ones, carrying it to the 0 position while the others are arrested at the 9 position.

Figures 11, 12, 13, 14, 15, 15A, 16, 17, 18, 19, 20:
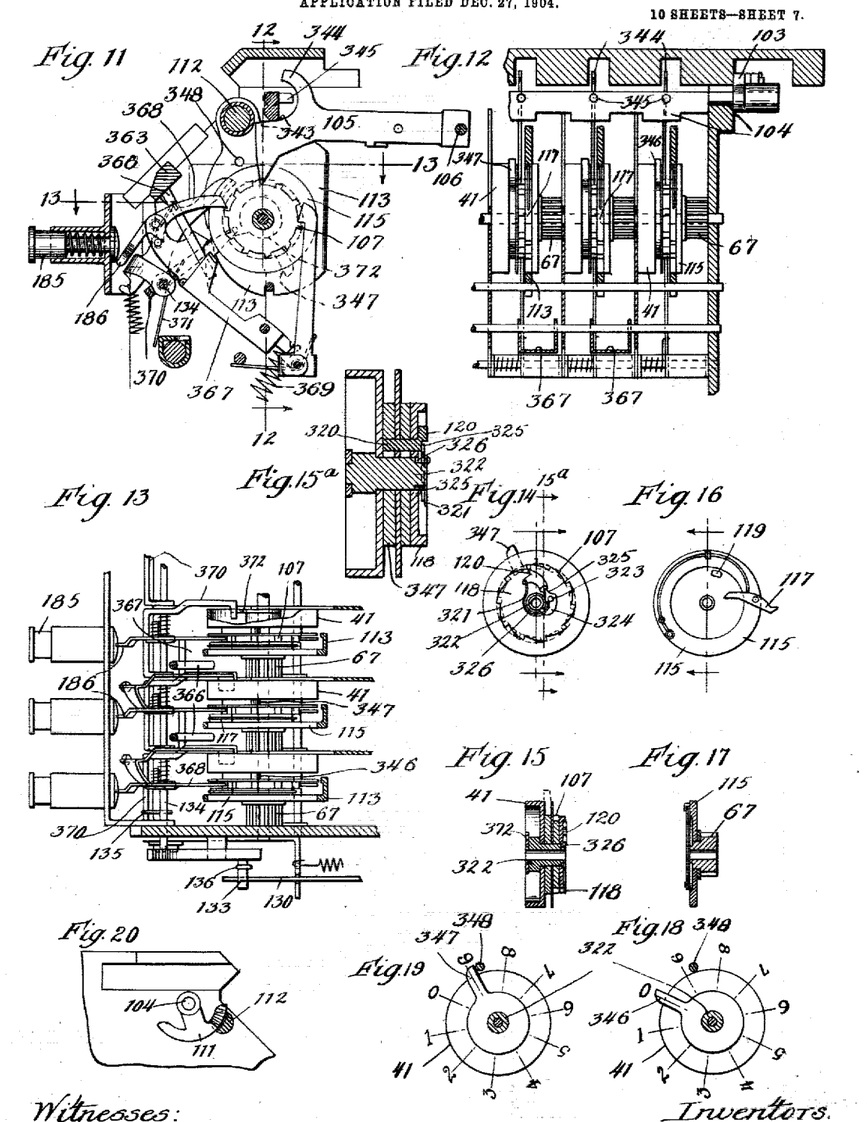
Figure 28:
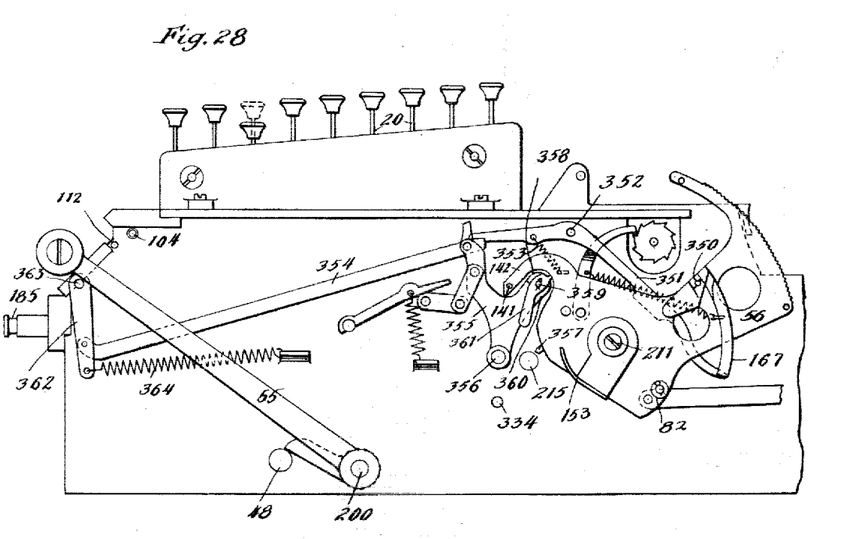
Fig. 28 is a partial side elevation, showing some of the parts in changed positions, and omitting other parts for clearness.

Upon the completion of the forward stroke of the main lever 55, said lever immediately commences its return and cam 56 likewise commences to return at the same time. This cam carries a pin 350 Figs. 25 and 28 which in this return movement encounters as shown at Fig. 28 the heel of a lever 351 which is pivoted stationarily at 352, and is provided with a retracting spring 353. The forward end of the lever engages a second lever 354, in much the same manner as the corresponding levers of Patent No. 749,177 engage. The rear end of lever 354 is supported upon and attached to the upper end of a bell crank 355, pivoted at 356. Normally the levers 351 and 354 are unlatched as at Fig. 25, but whenever the cam 56 receives its initial forward actuation, the point 357 on it encounters a roll 358 pivoted on pivot 359 supported in an arm 360 projecting from the crank 355. The roll may be and is cut away at one side and carries an arm 361. With this construction it will be seen that when the point 357 encounters the roll, the latter will be turned about one third the way round so that the position of the arm 361 is reversed and in this same movement, the crank 355 will be moved toward the front of the machine so as to carry lever 354 into position and a little beyond where it may engage lever 351. As the point 357 moves off the roll, it allows the crank to recede partially, and the engagement between the two levers takes place then as shown at Fig. 2. The lever 354 extends to the front of the machine and is pivotally joined to an arm 362 mounted upon a shaft 363 and provided at its lower end with a retracting spring 364. The shaft 363 carries a series of fingers 366, which project downwardly, as seen at Fig. 11, and into position where they may control the swinging lever 367 supporting the carrying pawls 368.

369 represents the retracting springs acting on levers 367. When the crank 355 is actuated as above stated, it forces lever 354 toward the front of the machine and in so doing, rocks shaft 363, bringing the fingers 366 against the levers 367 and carrying the upper ends of the levers so far away from the numeral wheels as to prevent action by the carrying pawls.

When the operation just described takes place, the carrying hooks 370 are allowed to drop into position under the power of their springs 371 between the levers 367 and the wheels, and thus to hold the levers 367 from returning. As soon as this action has taken place, the fingers 366 are allowed to retreat partially by the disengagement of the point 357 from the roll 358, the retracting spring 364 now bringing the two levers into full engagement. This receding movement allows the fingers 366 to move away from the levers 367 a short distance. The levers 351 and 354 remain engaged as in Fig. 2, however, until near the end of the return stroke of the cam 56, and consequently the carrying pawls remain locked out of action during the same time. When the unit wheel is positioned at the zero position as described above in the canceling operation, and in passing from the 9 to the 0, the cam 372 on that numeral wheel engages the end of the carrying hook 370 and raises it sufficiently to free it from the lever 367, allowing that lever under the action of its spring to move up against the finger. This movement, however, does not allow the carrying pawl to move into its acting position. As the main cam nears the conclusion of its return stroke, it actuates the lever 351, destroying the engagement between said lever and lever 354 so that lever 354 is free to move back to its initial position, and in so doing, to release the carrying lever 367 and permit the carrying pawl to carry the tens numeral wheel bringing it to 0. This movement of the tens wheel results in a like movement in the hundreds wheel and so on through the series, bringing them all to zero. In the return movement of cam 56, no contact between the projection 357 and roll 358 takes place.

Figure 25:
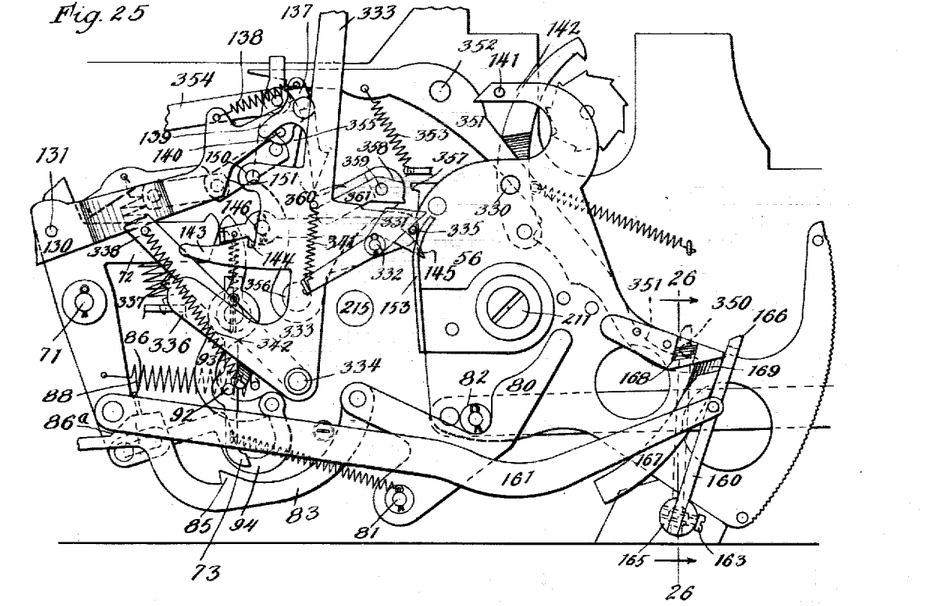
Fig. 25 is a partial side elevation enlarged.
Figure 26:
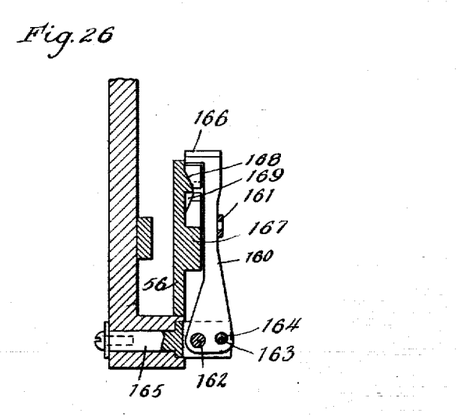
Fig. 26 is a section on the line 26—26 of Fig. 25.
Figure 27:
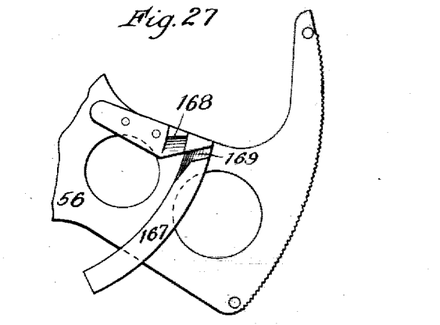
Fig. 27 is a side elevation of parts shown in Fig. 25.

In the printing of the totals in the ordinary manner, the sub-total lever is swung backward by the operation of the mechanism at the proper time and to prevent its being swung backward by hand at other times which would tend to cause the printing of a row of nines instead of the figures on the numeral wheels, we provide a safeguard consisting of a lateral flange 153 Fig. 25 on the forward edge of the main cam adapted to engage the rearwardly extending arm of the subtotal lever at all times when the lever and main cam are in normal position and at all other times except when the main cam is nearing the end of its forward stroke and has carried the flange to a point below the arm of the lever, leaving the lever free to move rearwardly at the proper time in the operation of the mechanism.

In the canceling operation above described, the turning of the tens wheel from nine to zero is dependent upon the turning of the units wheel from nine to zero so as to cause a carrying of the tens wheel. But it often happens that the unit wheel will be standing at zero at the commencement of the canceling, and consequently it remains motionless during that operation, so that other means are required for starting the train of carrying mechanisms in operation at such times. These means may be the following; at 130 of Figs. 1 and 2 is a substantially horizontal lever pivoted at 131 upon the releasing lever 70 and shifted whenever the releasing lever is adjusted. A spring 132 tends to draw this lever toward the front of the machine, and upon the front end rests an arm 133, held down by a spring 136 and fast upon a cross shaft 134, this being the shaft upon which the carrying hooks 370 are mounted. When the front end of lever 130 is raised, as presently described, it imparts a rocking motion to shaft 134, and through this motion of the shaft a pin 135 inserted transversely in the shaft presses upon the part of the units wheel hook 370 which lies parallel with said shaft and depresses the same, and thus lifts the inner end of the hook so that it releases or unlatches the lever 367 and puts the latter in condition to move toward and cause the carrying of the wheel as soon as the lever 367 is released by finger 366. This operation of the carrying mechanism, it will be seen is entirely independent of any rotation of the units wheel. The lever 130 is actuated so as to rock shaft 134 as stated by the following means: Upon the rear end of the lever is a swinging hook 137 having a spring 138 tending to throw its arm 139 against a stop 140. This hook is adapted to be engaged by a pin 141 upon a horn 142 of the main cam 56 when the main cam makes its forward stroke and the hook 137 is in the position which it occupies when the machine is set for total printing, no engagement taking place at other times. This engagement carries the rear end of the lever 130 downward and raises the forward end so that shaft 134 is rocked. When the total lever is in the position occupied by it during the key printing operations, the lever 130 is so far toward the front of the machine that pin 141 on cam 56 does not engage hook 137.

The subtotal lever is intended to prevent the automatic canceling following the printing of the totals, and it is adapted to perform this function by moving it from the position of Fig. 2 toward the front of the machine at the same time that the lever 70 is positioned for total printing. It is provided with an arm 143 Fig. 25 having an open slot 144 and into this slot the bent end of a latch 145 pivoted upon a stationary pivot 146 falls when the lever is positioned as just stated, and locks the lever in its new position. In this change of position, the trip 331 already mentioned moves so far toward the front of the machine as to carry it out of the path of the pin 330 upon the main cam by which it is normally engaged. And by reason of this omission to engage the trip, the train of operations which we have previously described and which are caused by such engagement, do not take place. In other words, the numeral wheels remain locked so that the canceling cannot take place. The forward positioning of the subtotal lever also carries a pin 150 borne upon it against the inclined surface 151 and lifts lever 130 above its normal position, so that no engagement takes place between the pin 141 on the main cam and the hook 137. The lifting of the rear end of lever 130 is without effect upon the carrying hook shaft. The rear end of latch 145 projects as plainly shown at Fig. 25 so that the pin 330 on the main cam encounters it as the cam nears the end of its forward stroke in the subtotaling operation. This engagement is adapted to lift the forward end of the latch and free it from its locking engagement with the subtotal lever so that the lever is then permitted to return to normal position under the power of its spring 152.

In operating the machine properly, the operator should not undertake to change the position of the releasing lever after he has commenced a stroke of the main or power lever, and to prevent any such thing, we have provided means for locking that lever during the operation of the main lever, and also for locking the machine while the lever is being set by hand for total printing. To this end, we connect the releasing lever with a swinging lever 160 by a link 161, Fig. 25. The lever 160 is pivoted upon a pivot 162 and its motion is limited by a pin 163 entered in a hole 164 somewhat larger than the pin, said pivot and pin being inserted transversely in a rocking shaft 165 having a slotted head to receive the end of the lever 160. This shaft is inserted in the side frame of the machine. The lever 160 has an overhanging portion 166 at its upper end and this overhanging portion is adapted to engage the sector 167 upon the side of the main cam 56 when the releasing lever is set for the normal key printing, and during that time it prevents any setting of the releasing lever for total printing, because such setting would bring the overhang against the edge of the sector, and when the releasing lever is set for total printing, it causes the locking lever 160 to move from the position given in full lines at Fig. 25 to that shown in dotted lines in the same figure, and in this position when the main lever is operated, the overhang rides up on an incline 168 and falls behind sector 167 and follows said sector until the main cam nears the conclusion of its return stroke. In this return stroke, the overhang is compelled to return to its normal position shown at Fig. 25 by the inclined cut or slot 169 which permits it to swing from the inside of the sector to the outer side. This incline does not permit movement in the other direction. In this manner, it will be noted that the operator after he has started to set the releasing lever for key printing, for instance, cannot change its setting to that of total printing until after the main lever has completed its stroke, and in the same manner he is prevented from changing from the total printing to the key printing until after he has completed the stroke of the main lever. And it will also be noted that while the total lever is being moved by hand from one position to the other, the overhanging portion of lever 160 is over the end of sector 167 so that the main cam will be locked.

Figures 21, 24:
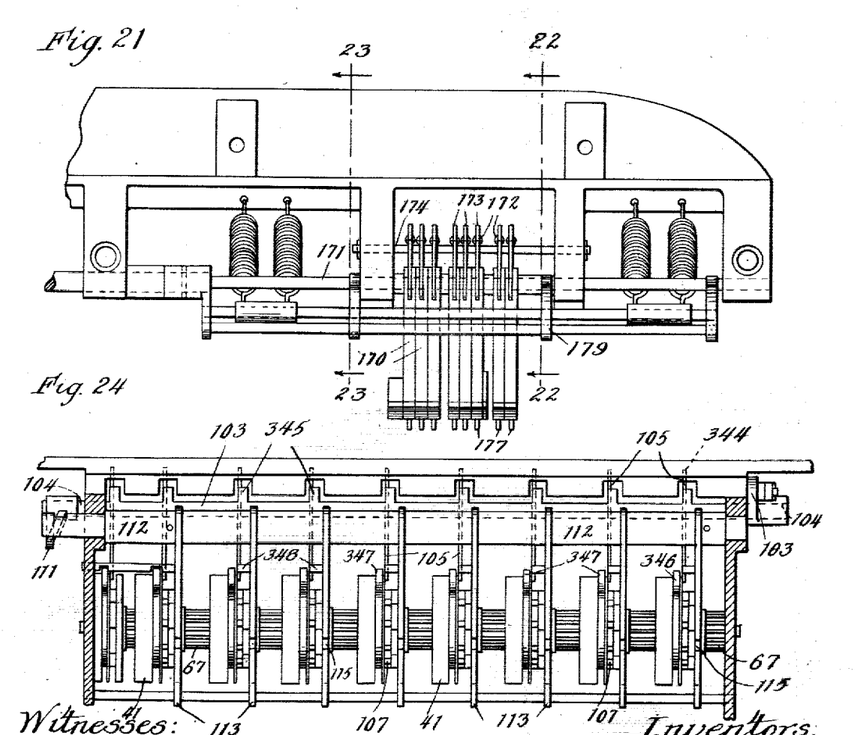
Fig. 21 is a front elevation of the hammer mechanism.
Fig. 24 is a front cross vertical section showing the numeral wheels and answer rings in elevation.
Figure 22:
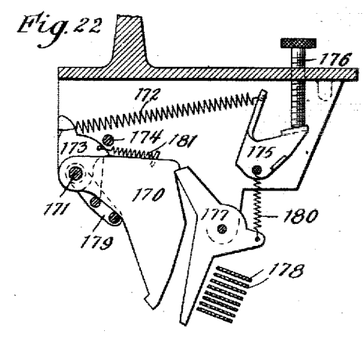
Figs. 22 and 23 are sections of such mechanism on the lines 22—22 and 23—23 respectively of Fig. 21.
Figure 23:
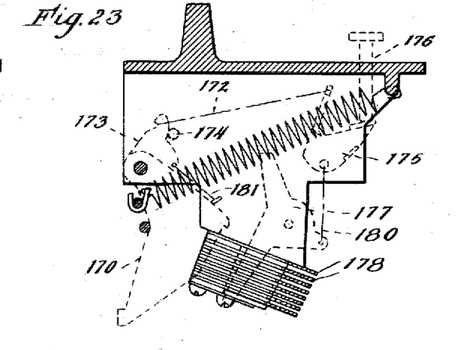

The printing hammers are shown at 170 Figs. 21 to 23 and swing upon the shaft 171. They are actuated by springs 172 acting upon heads 173 also pivoted upon shaft 171 and bearing upon the top of the hammers. A stop rod 174 extends across the series of hammers and limits the stroke of the heads 173. The springs 172 are attached to a swinging adjuster 175 provided with adjusting screw 176 whereby the tension of the springs 172 is regulated. The hammers are normally held by triggers 177 which are released by releasing frames 178 and are raised after each printing operation by a swinging frame 179. The triggers are provided with springs 180. The heads 173 are made separate from the hammers for the purposes set forth in the patent to D. E. Felt, No. 661,121, of Nov. 6, 1900, but in the present invention we have improved upon the patented construction by adding in the case of each hammer, a spring 181 attached at one end to the head 173 and at the other to the hammer. In the patented construction, it was found that the hammer sometimes made what are called in shop parlance, double printing, that is, they would strike the paper more than once and thus leave a blurred impression. The spring 181 is adapted to prevent this. The construction of the releasing frames and their mode of operation is fully set forth in patent to Felt No. 644,287 of Feb. 27th, 1900.

At 185 are spring push buttons, one for each denomination. These push buttons are adapted to bear upon the tail ends 186 of the carrying pawls 368 when it is desired to subtract instead of add. The mode of operation of these push buttons will be fully understood from the patent to Felt, No. 465,255, dated December 15, 1891.

Figures 5, 6, 7:
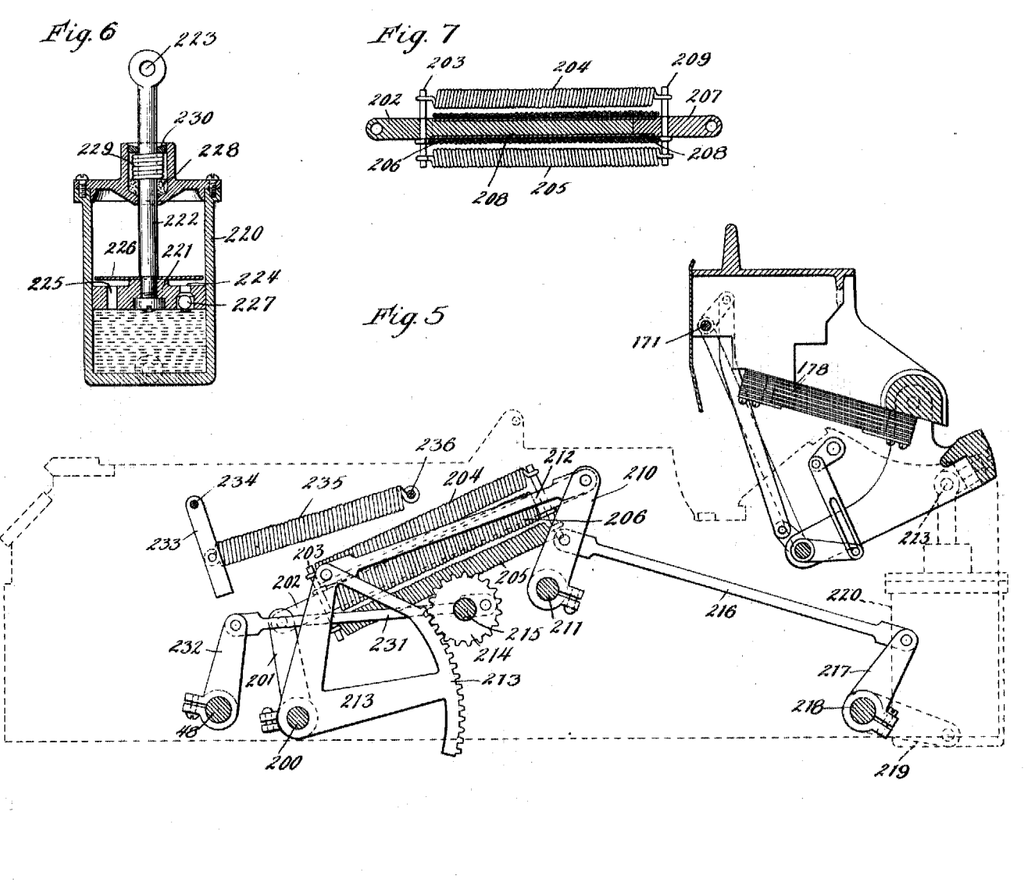
Fig. 5 is a partial longitudinal section taken in a plane at the farther side of the machine.
Fig. 6 is a detail section of the governor.
Fig. 7 is a detail section of the spring power transmitting mechanism shown at Fig. 5.

In the said Felt patent No. 749,177, the main actuating lever is attached directly to the main cam, but in the present invention we have interposed between the lever and the registering and printing mechanism of the machine a spring cushioning mechanism and a governor adapted to prevent the shocks to the registering and printing mechanisms which would attend violent or too quick operations of the main lever. This mechanism will now be described and is best shown at Figs. 5 and 7. Said power device is mounted upon a shaft 200 extending across the machine and carrying at its further end a crank 201. This crank is pivotally joined to a rod 202 in which a cross pin 203 is secured, such pin serving as means for the attachment to the rod 202 of a series of springs 204, 205 and 206. The rod 202 abuts against a shorter rod or bar 207 to which a sleeve 208 is attached. This sleeve extends over and incloses the rod 202 for the major portion of its length. The rod 207 also carries a crosspin 209 to which the other ends of the springs 204, 205 and 206 are attached. The springs 204 and 205 are preferably located, one above and one below the rods 202 and 207, and the spring 206 preferably encircles the sleeve 208, this arrangement and series of springs being adopted in order to obtain the desired spring power without giving the combined structure any great horizontal width. The bar 207 is joined to a crank 210 on a shaft 211. The main lever receives a forward stroke or impulse from the operator when the amount set by the keys is to be added and printed, and in so doing, the crank 201 is carried to the front of the machine and strains the springs 204, 205, and 206 by drawing on the rod 202 and through the springs this power is transmitted to the rod 207 and the crank 210. The main cam 56 is mounted on shaft 211 and through such main cam the printing is effected, as will be understood from the description given in a subsequent part of this specification. The speed of the movement thus imparted to the cam shaft is, however, controlled by a governor 220 located at the rear of the machine and mounted between crank arms 219 fast upon the shaft 218. Shaft 218 also carries a crank 217 which is connected to a crank 210 by a link 216. The governor is movable in a vertical direction, being lifted by the crank 219 by the power received from the springs. The piston 221 of the governor is mounted upon the stem 222 and the stem is pivotally attached to a stationary part of the machine at 223. Two ports 224 and 225 are formed in the piston and are preferably covered by an overhanging plate 226 so that the movement of the fluid through the ports is somewhat restricted. One of the ports is provided with a ball valve 227 which closes when the governor is lifted by the crank and opens when the governor is moving down. It will thus be noted that the fluid in the governor moves up through the piston which is stationary at a much slower rate than it moves down therethrough. The stem passes through a stuffing box in which 228 represents the packing, 229 a spring for compressing the packing, and 230 a nut threaded in the mouth of the box and confining the spring and packing. The construction thus far described allows the main lever 55 to make uniform strokes and thereby to store up power in the springs 204, 205 and 206, which is then exerted in actuating shaft 211 at such speed as is permitted by the governor, and by this construction, I avoid injury to the machine which would attend the giving of unduly quick or sudden movements of the main lever.

The movement of the main actuator is taken from the same crank 210 which actuates the main cam and the means employed for this purpose are the following; A link 212 extends from the swinging end of crank 210 to a segment 213 mounted loosely upon shaft 200 and a portion of this segment is toothed and meshes with a crank gear 214 upon a shaft 215. A link 231 extends from the crank wheel 214 to a crank 232 fast upon the main actuator 48. The segmental rack is adapted to turn the pinion 214 through something over a half revolution and thereby it oscillates or rocks the shaft 48 as will be understood from Fig. 5. In order that the crank wheel and segment may be returned to their starting position with certainty, notwithstanding the fact that the crank-wheel moves so far as to carry the pin uniting the link to it beyond the dead center, I provide a spring lever 233 in such location that it will be encountered by the segment rack before the rack has completed its movement. This lever may consist of a straight bar of metal pivoted at 234 and joined to one end of a spring 235, the other end of which is attached to a stationary pin 236. This lever will be swung by the segment so that power will be stored in the spring 235 wherewith to start the segment on its backward movement as soon as the power from the crank 210 ceases.

We claim:—

1. The combination with the main power device, and the registering and printing mechanism, of a spring cushioning mechanism and a governor, said cushioning mechanism consisting of a series of springs connected at their ends to the power device and the actuating devices of said registering and printing mechanism, and adapted to be strained by the power device, and the abutting rods 202 and 207 and the sleeve mounted on one of said rods and extending over the other.

2. The combination with the main power device, and the registering and printing mechanism, of a spring cushioning mechanism and a governor, said cushioning mechanism consisting of a series of springs connected at their ends to the power device and the actuating devices of said registering and printing mechanism, and adapted to be strained by the power device and the abutting rods 202 and 207 encircled by one of the springs.

3. The combination with the main power device, and the registering and printing mechanism, of a spring cushioning mechanism and a governor, said cushioning mechanism consisting of a series of springs arranged in a vertical plane one over the other and connected at their ends to the power device and the actuating devices of said registering and printing mechanism and adapted to be strained by the lever, and the abutting rods 202 and 207 encircled by one of the springs.

4. The combination with the main power shaft 200, of cranks 201 and 210, the cushioning springs joined to said cranks, the main actuator, devices connecting crank 210 to the main actuator and a governor also connected to crank 210.

5. The combination with the main actuator and the cushioning springs, of the segment 213, a crank 214 meshing with the segment and a link connecting crank 214 with a crank on the main actuator shaft.

6. The combination with the main actuator and the cushioning springs, of the segment 213, a crank 214 meshing with the segment, a link connecting crank 214 with the crank on the actuator shaft, and means for starting the segment on its return stroke.

7. The combination with the main actuator and the cushioning springs, of the segment 213, a crank 214 meshing with the segment, a link connecting crank 214 with the crank on the actuator shaft, and a spring pressed lever 233 for starting the segment on its return stroke.

8. The combination with the main actuator and the cushioning springs, of the segment 213, a crank 214 meshing with the segment and a link connecting crank 214 with a crank on the main actuator shaft and normally moving beyond the dead center, and a spring pressed device for starting the parts in their return movement.

9. The combination in a tabulating machine of a power shaft, a crank on said shaft, a rod 202 pivotally joined to the crank, a second rod 207 abutting said rod 202, a sleeve attached to one of said rods and extending over the other, springs attached at their ends to said rods, a shaft 211, and a crank 210 mounted on shaft 211 and having a pivotal attachment to rod 207.

10. The combination in a tabulating machine, of the power shaft 200, the shaft 211, cranks on both shafts, and a yielding connection between the cranks consisting of springs and abutting rods joined to said cranks, one of the rods carrying a sleeve extending loosely over the other rod.

11. The combination with the numeral wheels, and their accompanying disks 115, the spring pawls 117 and ratchets 118, of the spring stops 120 having pivots let into the ratchets, spring clips for confining the stop pivots in the ratchets, and the answer rings.

12. The combination with the numeral wheels, and their accompanying disks 115, the spring pawls 117 and ratchets 118, of the spring stops 120 having pivots let into the ratchets, clips bearing on the pivots of the stops, and riveted between their ends to the ratchets, and having their heels entered in recesses in the ratchet, and the answer rings.

13. The combination with the disks 115, and their pawls 117 and pins 119, with the answer rings, the ratchets 118, and the spring stops 120 on the ratchets, said stops acting to engage with said pins when the rotation is in one direction only.

14. The combination with the disks 115 having pins 119, and the ratchets having spring stops 120 engaging the pins, said stops having pivots projecting into the ratchet and confined therein by movable clips permitting ready removal of the stops.

15. The combination with the numeral wheels, their ratchets 118, and the locking levers 105 thereof, of the column actuators, the disks adapted to rotate independently of the wheels, and to be actuated by the column actuators, means for arresting the disks when they have been turned to the position occupied by the numeral wheels, such means consisting of the pins 119 on the disks and the springs stops 120 carried by the ratchets, and means for temporarily disengaging the disks from the numeral wheels.

16. The combination with the numeral wheels, their ratchets 118, and the locking levers 105 thereof, of the column actuators, the disks adapted to rotate independently of the wheels, and to be actuated by the column actuators, means for arresting the disks when they have been turned to the position occupied by the numeral wheels, such means consisting of the pins 119 on the disks and the spring stops 120 carried by the ratchets, the pawls on the disks engaging the ratchets, and the answer rings for preventing action by the pawls.

17. The combination with the numeral wheels, the column actuators, the locking levers 105 provided with overhanging horns and the shaft 104 having projections acting on said horns, of means for setting the mechanism for totalizing, and means for giving power to the actuators.

18. The combination with the numeral wheels, the column actuators, the locking levers 105 provided with overhanging horns and the shaft 104 having projections acting on said horns, of totalizing lever 70, the bar connecting said lever to shaft 104 and means for giving power to the actuators.

19. The combination with the numeral wheels, the column actuators, the locking levers 105 provided with overhanging horns and the shaft 104 having projections acting on said horns, totalizing lever 70 having a pin 102, the bar rocking the shaft 104 and having a slot to receive said pin, means for lifting the bar, and means for actuating said lifting means and giving power to the actuators.

20. The combination of totalizing lever 70 having the pin 102 in combination with the numeral wheels, the locking levers 105, the rock shaft 104, the bar 100 having slot 101, the lower portion of which is elongated, and means for lifting said bar so as to bring it into the long portion of the slot.

21. The combination with the totalizing lever having a pin 102, of the locking levers 105 and their controlling shaft 104, and the slotted bar 100 connecting the shaft with the lever, said bar acting to rock the shaft and put the levers 105 into service when the lever is set, and also allowing the shaft to rock back and release levers 105 without moving the lever from its set position.

22. The combination with the totalizing lever 70, the numeral wheels, and the levers 105 for locking the wheels, of connecting mechanism between the lever 70 and said levers 105 whereby the former may set the latter, such connecting mechanism embodying a horizontal bar having two positions in one of which it sets the levers 105 and in the other of which it permits said levers to release the wheels.

23. In canceling mechanism, the combination with the units wheel having arm 346 and the other numeral wheels having arms 347 relatively arranged as specified, the answer rings having devices engaging said arms, in combination with means for rotating the wheels after they have been released from their locking devices and said locking devices.

24. In combination with the totalizing lever, the numeral wheels and their locking devices controlled by said lever, arms projecting from the numeral wheels, the one from the units wheel being positioned at 0 and those from the other wheels being positioned at 9, means of releasing the lock upon the wheels, column actuators embodying springs which are strained by reason of the locking of the wheels and which act to rotate the wheels as soon as the lock thereon is released, and means engaging said arms and thereby arresting the wheels.

25. In total printing and canceling mechanism, the combination of the numeral wheels having projecting arms whereby they may be arrested at the 0 and 9 positions, and means for rotating them, with devices for arresting the wheels by engaging said arms, said devices being moved into acting position when the mechanism is set for total printing.

26. The combination with the totalizing levers 70, the numeral wheels, and the levers 105 for locking the wheels, of connecting mechanism between the lever 70 and said levers 105 whereby the former may set the latter, such connecting mechanism being adapted to permit the release of the wheels by levers 105 without any change of position by lever 70.

27. The combination with the sub-total lever, of the main cam and guard 153, the latter engaging the lever when moved backward.

28. The combination with lever 70, of swinging lever 160 having an overhanging portion 166, the main cam and the sector on the cam.

29. In printing mechanism, the combination with the hammers and their heads 173 made separate from the hammers, of springs 181 attached at one end to the heads and at the other to the hammers.

30. In a registering and recording machine, means for temporarily locking the registering wheels to position the types for printing the total, in combination with automatic means for releasing the registering wheels after printing the total so as to permit of their turning to zero.

31. In a registering and recording machine, means for temporarily locking the registering wheels to position the types for printing the total, in combination with automatic means for releasing the registering wheels after printing the total so as to permit of their turning to zero, and means for turning them to zero.

32. In a registering and recording machine, means for temporarily locking the registering wheels to position the types for printing the total, in combination with automatic means for releasing the registering wheels after printing the total so as to permit of their turning to zero, means for turning the wheels to zero and means for preventing the operation of the returning means when it is desired to print the answer without canceling.

DORR E. FELT.
CHARLES P. WETMORE.

Witnesses:
EDWARD S. EVARTS,
H. M. MUNDAY.